United States Patent [19]

Neis et al.

[11] Patent Number: 4,567,666
[45] Date of Patent: Feb. 4, 1986

[54] TILT SENSOR NULL ADJUSTING APPARATUS

[75] Inventors: Thomas W. Neis, Phoenix; Harold L. Swartz, Glendale, both of Ariz.

[73] Assignee: Sperry Corporation, New York, N.Y.

[21] Appl. No.: 527,908

[22] Filed: Aug. 30, 1983

[51] Int. Cl.[4] .......................... G01C 9/06; G01C 9/28
[52] U.S. Cl. .................................. 33/180 R; 33/366; 33/385; 73/1 E
[58] Field of Search ............... 33/180 R, 333, 354, 33/366, 385, 386, 387, DIG. 12; 340/689; 74/89.15, 509; 73/1 E; 269/60

[56] References Cited

U.S. PATENT DOCUMENTS

| 2,068,017 | 1/1937 | Given | 33/387 |
| 3,407,018 | 10/1968 | Miller | 74/89.15 |
| 3,541,870 | 11/1970 | Lyons | 74/89.15 |
| 3,681,849 | 8/1972 | Venables | 33/385 |
| 4,012,030 | 3/1977 | Hesselgren | 269/60 |
| 4,470,199 | 9/1984 | Krezak et al. | 33/366 |
| 4,503,622 | 3/1985 | Swartz et al. | 33/366 |

FOREIGN PATENT DOCUMENTS

| 458763 | 8/1968 | Switzerland | 33/386 |
| 242826 | 11/1925 | United Kingdom | 33/386 |
| 615570 | 1/1949 | United Kingdom | 33/386 |

Primary Examiner—Richard R. Stearns
Attorney, Agent, or Firm—Howard P. Terry; Martin G. Anderson

[57] ABSTRACT

A null-adjusting tool for aligning a tilt sensor of the electrolytic liquid type to the vertical is provided. A sensor mounting plate with a tilt-sensing element attached thereto is rotated about a pivot pin by the rotation of a coarse and fine adjustment screw. The coarse adjustment screw acts directly on the sensor mounting plate. The fine adjustment screw provides a high degree of position resolution control through a combination of screw thread and lever type mechanical advantage. A digital readout containing a liquid crystal display and self-contained power source is mounted on the null-adjusting tool to provide a visual indication of the angular deviation of the tilt sensor from the vertical during the alignment process.

1 Claim, 3 Drawing Figures

TILT SENSOR NULL ADJUSTING APPARATUS

BACKGROUND OF THE INVENTION

1. Field of the Invention

This invention relates to a null-adjusting tool, and more particularly to a null-adjusting tool for the precise alignment of a tilt sensor to the vertical or the local gravity vector.

2. Description of the Prior Art

Leveling or tilt-sensing devices are well known in the art. A simple example is a carpenter's level containing an arc-shaped elongated sealed galss tube, partially filled with a liquid. An air bubble in the sealed tube responds to the position of the level giving a visual indication of the inclination from the vertical or from the horizontal. An improved bubble level, also known in the art and described in patent application Ser. No. 486,631 by Swartz, et al, filed Apr. 20th, 1983 and assigned to the assignee of the present invention utilizes an arcuate tube partially filled with an electrically conducting liquid. Electrical contacts within the tube are attached to an electronic readout device for a more accurate measurement of tilt than is possible by visual interpretation of the position of an air bubble within the tube.

In order to take full advantage of the high accuracy offered by electrolytic-type tilt sensing devices, it is necessary to precisely align the tilt-sensing device to the local gravity vector. Accurate alignment of bubble levels of the electrolytic type have previously required null-adjusting tools that are of instrument quality, generally, precision machined micrometer mechanisms. After alignment, such tools remain attached to the device and become part of the tilt-sensing mechanism. They are delicate to use and expensive to manufacture.

In U.S. Pat. No. 4,378,693, filed Feb. 11, 1981 and issued Apr. 5, 1983 to E. C. Ratcliffe, a deflection measuring system is described which provides an electrical circuit for electronically leveling the tilt sensor. However, this circuit employs a D.C. coupled differential amplifier, which is subject to errors due to drift and D.C. offset.

The present invention incorporates a mechanical null-adjusting mechanism and a digital readout device in one portable tool that does not require micrometer or custom fine thread adjustment mechanisms, is simple to operate, and may be removed after alignment of the tilt sensor. Thus, one null-adjustment tool which is the subject of the present invention may be used to align a multiplicity of tilt sensors such as might be found in a system used to monitor the movement of a structure such as a building or a bridge.

SUMMARY OF THE INVENTION

The invention comprises a tool for the precise null-adjustment of a tilt sensor to the vertical or local gravity vector. The null-adjusting tool consists of a rigid alignment bar having, at one end, a pivot pin for insertion into a hole in the baseplate. A coarse adjustment screw is threaded through the alignment bar and bears on the tilt sensor mechanism. The opposite end of the alignment bar contains a channel to accommodate the movement of a fine adjustment screw. The fine adjustment screw passes through a bearing pin, which fits into a hole in the baseplate, and is then threaded through an adjustment pin fixed in the channel of the alignment bar. A digital readout device containing a power supply and liquid crystal display is mounted on the alignment bar and connected to the tile sensor through a multiconductor cable.

In operation, displacement forces are applied to the tilt sensor by rotation of the coarse and fine adjustment screws. A high degree of resolution in adjustment is achieved using standard thread screws because the fine adjustment screw utilizes the alignment bar as a lever arm to achieve a high mechanical advantage. When the liquid crystal display indicates the sensor is aligned to the vertical, the sensor may be clamped to the baseplate and the null-adjusting tool removed.

DESCRIPTION OF THE PREFERRED EMBODIMENT

Figure 1:
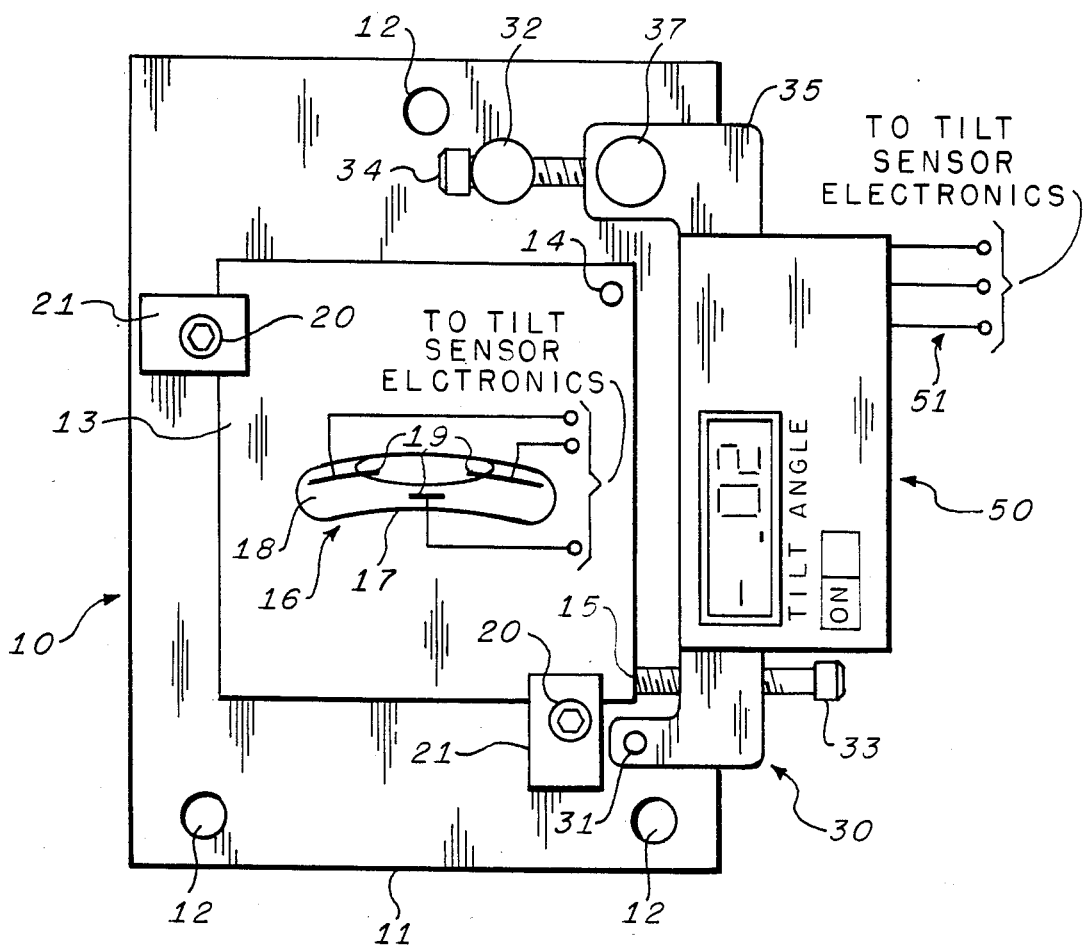
FIG. 1 is a typical tilt sensor with the null-adjustment tool in place.

Shown in FIG. 1 is a tilt sensor device 10 with the null-adjusting tool 30 and digital readout device 50 in position to align the tile sensor element 16 to the vertical or local gravity vector. Although the preferred embodiment describes an alignment to the vertical, the same principles would apply to aligning a tilt sensor to monitor horizontal tilt. The tilt sensor device 10 to which the present invention null-adjusting tool 30 is attached for alignment may typically include a baseplate 11 containing three or more holes 12 through which screws, bolts, or similar fasteners are used to attach baseplate 11 to a vertical surface of a stationary structure such as a bridge or building whose angular tilt is to be measured after the tile sensor element 16 is aligned to the vertical. The sensor mounting plate 13 contains a hole 14 through which passes a pin that is attached to baseplate 11. The sensor mounting plate 13 may rotate about the pin in hole 14 when acted upon by the null-adjusting tool 30. The null-adjusting tool 30, the operation of which will later be described in greater detail, contacts the sensor mounting plate 13 at 15. The null-adjusting tool 30 attaches to baseplate 11 by inserting pivot pin 31 and bearing pin 32 into holes in the baseplate.

The tilt-sensing element 16 typically consists of an elongated, arc-shaped, sealed tube 17, partially filled with an electrolytic liquid 18 and mounted on the sensor mounting plate 13. Contacts 19 are embedded in the sealed tube 17 for sensing the position of the conducting liquid 18. A description of a type of tilt-sensing element that may be aligned to the local gravity vector using the present invention is described in U.S. Pat. No. 4,503,622, filed Apr. 20, 1983, PRECISION INCLINOMETER WITH DIGITAL NUMERICAL READOUT, invented by Swartz, et al, and assigned to the assignee of the present invention, which is incorporated herein by reference.

In operation, pivot pin 31 and bearing pin 32 of null-adjusting tool 30 are inserted into two appropriately positioned loose tolerance holes in baseplate 11. The multiconductor cable 51 from the digital readout device 50 is connected to the electronic circuitry (not shown) of the tilt sensor element 16. The coarse adjustment screw 33 and fine adjustment screw 34 of the null-adjusting tool 30 are rotated until the digital readout 50 indicates that the tilt sensor element 16 is aligned to the vertical. Sensor mounting plate 13 may then be clamped to baseplate 11 by tightening bolts 20 of holding clamps 21. The null-adjusting tool 30 and digital readout device 50 are then disconnected and removed from the tilt-sensing device 10.

The present invention null-adjustment tool was designed for use with a tilt sensor system using a multiplicity of tilt sensors of the electrolytic liquid type. The design and electronic circuitry of the tilt sensor system is described in copending application Ser. No. 527,907, filed Aug. 30, 1983, TILT SENSOR AND MONITORING SYSTEM, invented by J. Heidel, et al and assigned to the assignee of the present invention and incorporated herein by reference.

Figure 2:
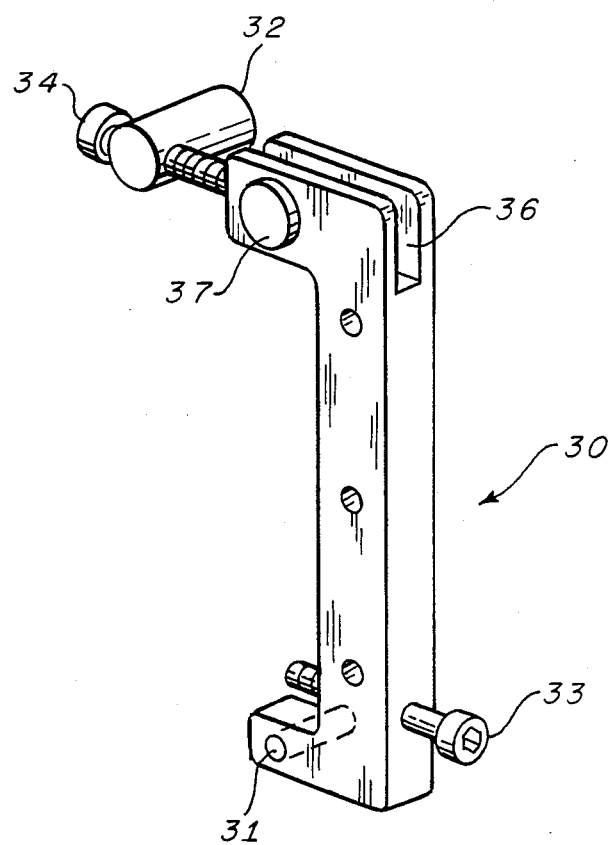
FIG. 2 is a diagram of the null-adjusting tool removed from the tilt sensor to show mechanical detail.

Referring now to FIG. 2, the null-adjusting tool 30 which is the subject of the present invention will be described. Alignment bar 35 is tapped and threaded as near as practical to pivot pin 31 to receive the coarse adjustment screw 33. Coarse adjustment screw 33 bears on sensor mounting plate 13 which is preferably slightly recessed at the point of contact 15 to provide a guide for the positioning of the coarse adjustment screw 33. Channel 36 is cut into alignment bar 35 at the end opposite from the pivot pin 31. A tapped and threaded adjustment pin 37 is fitted in channel 36 to receive the fine adjustment screw 34 which passes through a clearance hole in bearing pin 32. Bearing pin 32 is a round metal rod that acts as a reaction point and anchors one end of the null-adjusting tool 30 to the baseplate 11. Coarse adjusting screw 33 and fine adjusting screw 34 may both be standard 1/4-28 UNF screws.

In operation, clockwise rotation of coarse adjusting screw 33 causes a clockwise rotation of sensor mounting plate 13 and tilt sensor element 16 attached thereto. When the angle of the tilt sensor element 16 is within the range of the digital readout device 50, the fine adjustment screw 34 is rotated until the tile sensor element 16 is aligned with the vertical. Clockwise rotation on the fine adjustment screw 34 tends to apply a force causing rotation of alignment bar 35 around pivot pin 31. Since alignment bar 35 acts as a lever, mechanical advantage can be obtained by placing a fulcrum, in this case contact point 15, between adjustment pin 37 and pivot pin 31.

In the preferred embodiment, a 7 degree rotation of the fine adjustment screw 34 causes a rotation of the tilt sensor element of 0.05 arc minutes. It will be recognized that many different ratios of fine adjustment screw 34 rotation to tilt sensor element 16 rotation are possible by changing the physical dimensions of the null-adjustment tool 30 according to the equation $$\gamma = \frac{\theta}{60 \text{ arc tan} \frac{\overline{BC}}{360 \times P \times \overline{AB} \times \overline{CD}}}$$

where $\theta$ = the rotation of the tilt sensor element 16 in arc minutes.

$\gamma$ = fine adjustment screw rotation in degrees.

P = the number of fine adjustment screw threads per inch.

$\overline{AB}$ = the distance between adjustment pin 37 and pivot pin 31 in inches.

$\overline{BC}$ = the distance between pivot pin 31 and contact point 15 in inches.

$\overline{CD}$ = the distance from contact point 15 to pin 14.

Figure 3:
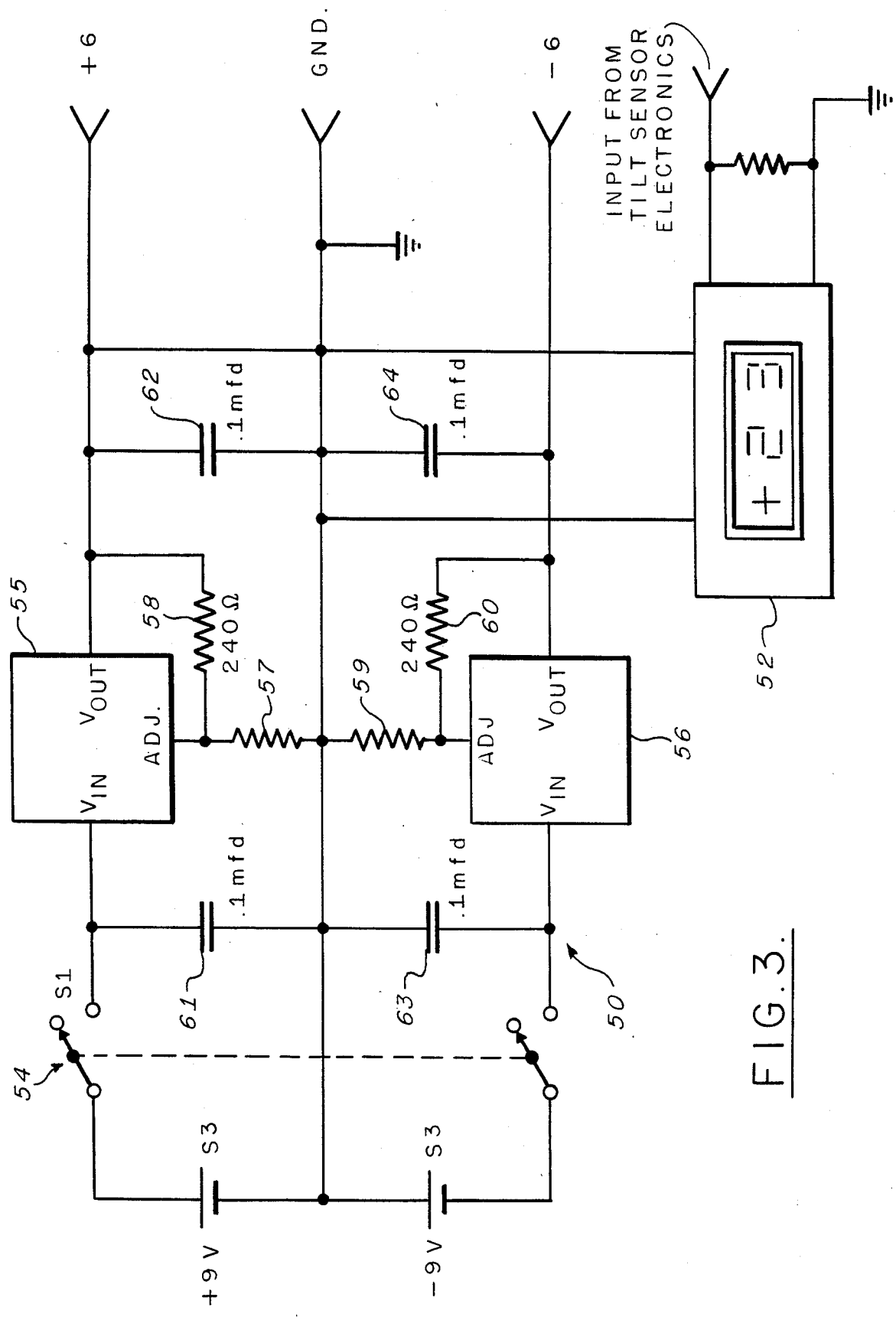
FIG. 3 is a schematic diagram of the power supply used in the digital readout device.

Referring now to FIG. 3, for portability and ease of use, it is desirable to provide a self-contained power supply and digital readout for the null-adjusting tool 30. Digital readout device 50 containing a DC power source and liquid cyrstal display 52 may be mounted on the alignment bar 35. Two 9v batteries 53 apply DC power through on-off switch 54 to a three-terminal positive regulator 55 and three-terminal negative regulator 56. The regulators are types well known in the art, for example, National Semiconductor Model LM317LZ may be used for the positive regulator 55 and National Semiconductor Model LM377LZ may be used for the negative regulator 56. Resistors 57 and 58 act as a voltage divider setting the positive output voltage at 6v. Resistors 59 and 60 act as a voltage divider setting the negative output voltage at −6v. Capacitors 61, 62, 63, and 64 are employed to assure stability and minimize settling time of the output voltage. The digital voltmeter module 52 is powered from the positive 6v output and may be conveniently a Datel Intersil Model DM-LX3.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. Apparatus for imparting a high degree of position resolution to a movable plate disposed to pivot on a base, said movable plate having a tilt sensor means disposed thereon, said apparatus comprising:

a lever arm having a first and second end with a first and second extension affixed perpendicular to said first and second ends respectively;

a pivot pin fixedly mounted to said first extension to engage said base;

a slotted reaction pin for engaging said base, said reaction pin having a fine adjustment screw passing therethrough to engage a threaded pin in said second extension of said lever arm;

a coarse adjustment screw threaded through said lever arm proximate to said first end and bearing on said movable plate, and a visual indicator means disposed on said lever arm responsive to said tilt sensor means angular deviation from a selected reference plane, said apparatus being removable from said base.

* * * * *